(12) United States Patent
Brule et al.

(10) Patent No.: US 11,407,906 B2
(45) Date of Patent: Aug. 9, 2022

(54) POWDER COMPOSITION OF POLYARYLENE ETHER KETONE KETONES ALLOWING AN EXCELLENT CASTABILITY/COALESCENCE BALANCE SUITABLE FOR LASER SINTERING

(71) Applicant: ARKEMA FRANCE, Colombes (FR)

(72) Inventors: Benoît Brule, Beaumont-le-Roger (FR); Hervé Ster, Serquigny (FR); Cyrille Mathieu, Lyons (FR); Nadine Decraemer, Beaumontel (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/044,939

(22) Filed: Jul. 25, 2018

(65) Prior Publication Data

US 2019/0040269 A1 Feb. 7, 2019

Related U.S. Application Data

(62) Division of application No. 15/105,977, filed as application No. PCT/FR2014/053386 on Dec. 17, 2014, now abandoned.

(30) Foreign Application Priority Data

Dec. 20, 2013 (FR) ........................................ 13.63201

(51) Int. Cl.
*C09D 7/61* (2018.01)
*C08K 3/22* (2006.01)
(Continued)

(52) U.S. Cl.
CPC .............. *C09D 7/61* (2018.01); *B29C 64/153* (2017.08); *B33Y 10/00* (2014.12); *B33Y 70/00* (2014.12);
(Continued)

(58) Field of Classification Search
CPC .......... C08L 61/04; C08L 61/16; C08G 8/26; C08G 8/02; C08G 6/00; C08K 3/36; C09D 5/037
(Continued)

(56) References Cited

U.S. PATENT DOCUMENTS 7,847,057 B2 12/2010 Mueller et al.
2006/0134419 A1 6/2006 Monsheimer et al.
(Continued)

FOREIGN PATENT DOCUMENTS

DE 102007016656 A1 10/2008
EP 1674497 A1 6/2006
(Continued)

OTHER PUBLICATIONS

Office Action dated Jul. 13, 2018, Gorodissky, in the Patent Application No. 2016129183/05(045408), English Translation only, (3 pages).
(Continued)

*Primary Examiner* — Jane L Stanley

(74) *Attorney, Agent, or Firm* — Buchanan Ingersoll & Rooney P.C.

(57) ABSTRACT

A method for producing a surface coated with a coating having an improved coalescence, the method including: providing a composition comprising from 99.6% to 99.99% by weight of at least one powder of at least one polyarylene ether ketone and 0.01 to 0.4% by weight of a hydrophilic
(Continued)

Kepstan 6003 PL    Kepstan 6003 PL + 0.2% TS-610 silica    Kepstan 6003 + 0.2% M-5 silica flow agent, the hydrophilic flow agent being hydrophilic silica; depositing the composition onto a surface forming a coated surface; and baking the coated surface to form a film on the surface.

16 Claims, 2 Drawing Sheets

(51) Int. Cl.
*C08K 3/36* (2006.01)
*C08L 71/00* (2006.01)
*B29C 64/153* (2017.01)
*B33Y 10/00* (2015.01)
*B33Y 70/00* (2020.01)
*B33Y 80/00* (2015.01)
*C09D 5/03* (2006.01)
*C09D 171/00* (2006.01)
*B29K 71/00* (2006.01)
*B29K 105/00* (2006.01)

(52) U.S. Cl.
CPC ............... *B33Y 80/00* (2014.12); *C08K 3/22* (2013.01); *C08K 3/36* (2013.01); *C08L 71/00* (2013.01); *C09D 5/037* (2013.01); *C09D 171/00* (2013.01); *B29K 2071/00* (2013.01); *B29K 2105/251* (2013.01); *C08G 2650/40* (2013.01); *C08K 2003/2227* (2013.01)

(58) Field of Classification Search
USPC ......................................................... 524/592
See application file for complete search history.

(56) References Cited

U.S. PATENT DOCUMENTS

| 2009/0280263 | A1 | 11/2009 | Richter et al. |
| 2009/0295042 | A1* | 12/2009 | Pfister .................. C08J 3/28 |
| | | | 264/497 |
| 2011/0027355 | A1 | 2/2011 | Lefevre et al. |
| 2011/0039093 | A1 | 2/2011 | Fukumura |
| 2012/0114848 | A1 | 5/2012 | Mueller et al. |
| 2014/0322441 | A1 | 10/2014 | Mathieu et al. |
| 2015/0183918 | A1 | 7/2015 | Le et al. |

FOREIGN PATENT DOCUMENTS

| RU | 2 496 340 C2 | 5/2012 |
| WO | 2013068686 A1 | 5/2013 |

OTHER PUBLICATIONS

International Search Report (PCT/ISA/210) dated May 4, 2015, by the European Patent Office as the International Searching Authority for International Application No. PCT/FR2014/053386.

Written Opinion (PCT/ISA/237) dated May 4, 2015, by the European Patent Office as the International Searching Authority for International Application No. PCT/FR2014/053386.

* cited by examiner

Kepstan 6003 PL        Kepstan 6003 PL        Kepstan 6003
                            + 0.2%                 + 0.2%
                         TS-610 silica           M-5 silica Kepstan 6003 PL Kepstan 6003 PL
+ 0.2% TS-610 silica Kepstan 6003 PL
+ 0.2% M-5 silica

POWDER COMPOSITION OF POLYARYLENE ETHER KETONE KETONES ALLOWING AN EXCELLENT CASTABILITY/COALESCENCE BALANCE SUITABLE FOR LASER SINTERING

CROSS REFERENCE TO RELATED APPLICATIONS

The present application is a divisional of U.S. application Ser. No. 15/105,977, filed on Jun. 17, 2016, which is a U.S. National Stage of International Application No. PCT/FR2014/053386, filed on Dec. 17, 2014, claims the benefit of French Application No. 13.63201, filed on Dec. 20, 2013. The entire contents of each of U.S. application Ser. No. 15/105,977, International Application No. PCT/FR2014/053386, and French Application No. 13.63201 are hereby incorporated herein by reference in their entirety.

TECHNICAL FIELD

The present invention relates to a composition comprising from 99.6% to 99.99% by weight of at least one powder of at least one polyarylene ether ketone and 0.01% to 0.4% by weight of a hydrophilic flow agent. This hydrophilic flow agent is characterized by a gain in mass (amount of water absorbed), after 5 days of conditioning at a relative humidity of 95%, of greater than 0.5%. This gain in mass of the flow agent is determined by Karl Fischer measurement after desorption of the water via a 15-minute treatment at 170° C. This composition is suitable for laser sintering. It in particular allows an excellent castability/coalescence compromise for the powder.

BACKGROUND

Polyarylene ether ketones and more particularly polyether ketone ketones (PEKK) are highly efficient materials. They are used for applications with temperature constraints and/or mechanical or even chemical constraints. These polymers are found in fields as varied as aeronautics, offshore drilling and medical implants. They may be used by molding, extrusion, compression, spinning or laser sintering, especially. However, their use in the latter process requires powder preparation conditions that ensure good flowability allowing implementation in the laser sintering process as described below.

The technology of powder sintering under a laser beam serves to manufacture objects in three dimensions such as prototypes and models, but also functional parts, especially in the motor vehicle, nautical, aeronautic, aerospace, medical (prostheses, auditive systems, cell tissues, etc.), textile, clothing, fashion and decorative fields, casings for electronics, telephony, home automation, information technology and lighting.

A thin layer of powder is deposited on a horizontal plate maintained in a chamber heated to a certain temperature. The laser supplies the energy required to sinter the powder particles at various points in the layer of powder in a geometry corresponding to the object, for example with the aid of a computer having the shape of the object in its memory and rendering this shape in the form of slices. Next, the horizontal plate is lowered by a value corresponding to the thickness of a layer of powder (for example between 0.05 and 2 mm and generally about 0.1 mm) and a new layer of powder is then deposited. The laser supplies the energy required to sinter the powder particles in a geometry corresponding to this new slice of the object, and so on. The procedure is repeated until the entire object has been manufactured.

In this process of powder sintering under a laser beam, it is imperative to have available powders that have good flowability, which allows good layering of said powders. Moreover, good coalescence of the powder is necessary after melting induced by the laser, so that the mechanical properties of the manufactured objects are maximized.

Powders are thus sought which have, firstly, good flowability and, secondly, good coalescence during the sintering process.

In the field of laser sintering, it is common practice to add flow agents to improve the flowability of powders.

US 2004/0 204 531 describes the advantage in polyamide of hydrophobic silicas versus hydrophilic silicas. Specifically, the flowability is deteriorated after moisture uptake in the case of using hydrophilic silicas, whereas it is unchanged in the case of using hydrophobic silicas.

In the field of polyarylene ether ketones (PAEK), the flowability is known to be improved by using a suitable heat treatment.

U.S. Pat. No. 7,847,057 relates to a process for the heat treatment of polyarylene ether ketone powders, which consists in exposing the powder to a heat treatment for over 30 minutes at a temperature 20° C. above the glass transition temperature of the polymer.

This treatment applied to polyether ether ketones (PEEK) makes it possible to obtain powders whose flowability is acceptable for the laser sintering process. The coalescence aspect is not discussed in said patent, and in particular no example demonstrates that the coalescence is effective, modified or even improved by the heat treatment.

WO 2012/047 613 also describes a heat treatment applied more particularly to polyether ketone ketone (PEKK) powders, which consists in exposing the powder to a heat treatment for several hours between the transition temperatures of the various crystalline phases, more particularly by approaching the melting point of the polymer, corresponding to the crystalline form having transition at the highest temperature. The flowability of the powder is thereby improved and the crystallinity resulting from this treatment is conserved during the sintering process, giving the sintered object certain advantageous physical properties, but appearing insufficient for certain applications. The coalescence aspect is not discussed in said patent, and in particular no example demonstrates that the coalescence is effective, modified or even improved by the heat treatment.

To satisfy the requirements of having available powders with good flowability and good coalescence, the Applicant conducted a series of tests demonstrating that, for polyarylene ether ketones, the addition of a hydrophilic flow agent firstly allows good flowability, and secondly that this flowability is conserved even after residence in a humid atmosphere. The latter result appears unexpected and very surprising with regard to the prior art (US 2004/0 204 531).

In addition, the Applicant found that, for such compositions, the coalescence of these polyarylene ether ketone powders supplemented with hydrophilic flow agent is superior to that of polyarylene ether ketone powders supplemented with hydrophobic flow agent.

SUMMARY

The invention relates to a composition comprising from 99.6% to 99.99% by weight of at least one powder of at least one polyarylene ether ketone and 0.01% to 0.4% by weight of a hydrophilic flow agent, preferably from 0.01% to 0.2% by weight of a hydrophilic flow agent and, more particularly, preferably from 0.01% to 0.1% by weight of a hydrophilic flow agent. This hydrophilic flow agent is characterized by a gain in mass (amount of water absorbed), after 5 days of conditioning at a relative humidity of 95%, of greater than 0.5%, preferably greater than 0.8%. This gain in mass of the flow agent is determined by Karl Fischer measurement after desorption of the water by a 15-minute treatment at 170° C.

The invention also relates to the use of the compositions of the invention and also to the objects manufactured with the aid of these compositions, in particular with the aid of a laser sintering process.

DETAILED DESCRIPTION

Figure 1:
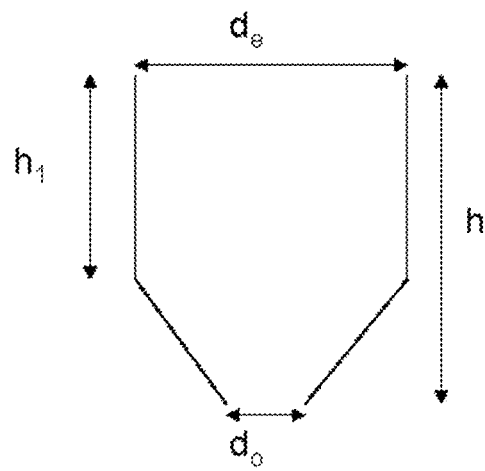
FIG. 1 is a diagram illustrating a funnel usable for measuring flowability in accordance with embodiments disclosed herein.

The polyarylene ether ketones (PAEK) used in the invention comprise units having the following formulae:

(—Ar—X—) and (—Ar$_1$—Y—)

in which:

Ar and Ar$_1$ each denote a divalent aromatic radical; a minor proportion (<10%) of these units may be replaced with radicals with a valency of greater than 2 to introduce branches.

Ar and Ar$_1$ may preferably be chosen from 1,3-phenylene, 1,4-phenylene, 4,4'-biphenylene, 1,4-naphthylene, 1,5-naphthylene and 2,6-naphthylene;

X denotes an electron-withdrawing group; it may preferably be chosen from the carbonyl group and the sulfonyl group, Y denotes a group chosen from an oxygen atom, a sulfur atom, an alkylene group, such as —CH$_2$— and isopropylidene.

In these units X and Y, at least 50%, preferably at least 70% and more particularly at least 80% of the groups X are a carbonyl group, and at least 50%, preferably at least 70% and more particularly at least 80% of the groups Y represent an oxygen atom.

According to a preferred embodiment, 100% of the groups X denote a carbonyl group and 100% of the groups Y represent an oxygen atom.

More preferentially, the polyarylene ether ketone (PAEK) may be chosen from:

a polyether ether ketone, also known as PEEK, comprising units of formula I:

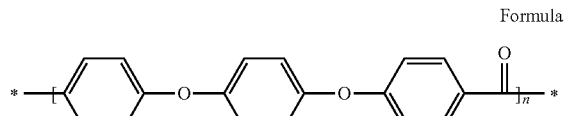

Formula I

The sequences may be totally para (Formula I), but it would not constitute a departure from the context of the invention to introduce, partially or totally, meta sequences. Two examples (non-limiting list) are given below:

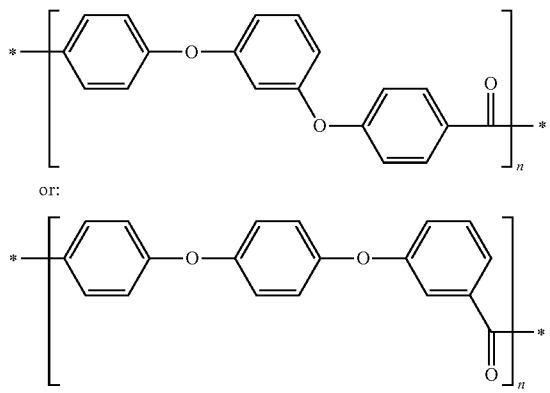

or:

a polyether ketone, also known as PEK, comprising units of formula II:

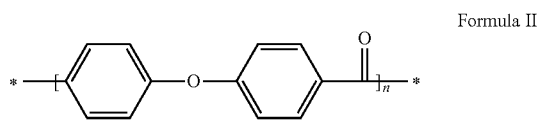

Formula II

Similarly, the sequences may be totally para (Formula II), but it would not constitute a departure from the context of the invention to introduce, partially or totally, meta sequences:

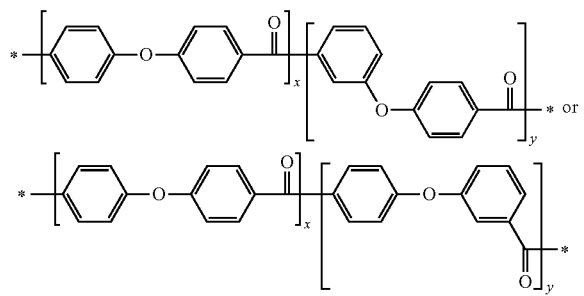

a polyether ketone ketone, also known as PEKK, comprising units of formula IIIA, of formula IIIB and a mixture thereof:

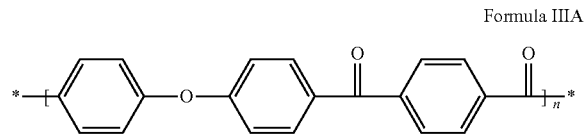

Formula IIIA

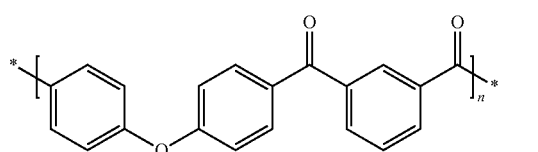

Formula IIIB and a polyether ether ketone ketone, also known as PEEKK, comprising units of formula IV:

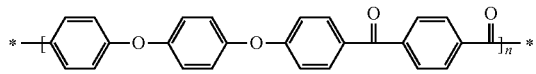

Formula IV

Similarly, meta sequences may be introduced into this structure without departing from the invention.

Other arrangements of the carbonyl group and of the oxygen atom are also possible. It would therefore not constitute a departure from the context of the invention to use them.

It is also possible to incorporate into the structure a divalent radical of the phthalazinone type having the following formula:

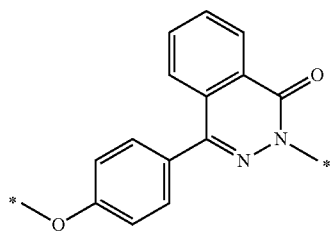

The polyarylene ether ketone that may be used according to the invention may be semi-crystalline or amorphous. Preferably, the polyarylene ether ketones are polyether ketone ketones comprising a mixture of units IIIA and IIIB such that the mass percentage of terephthalic units relative to the sum of the terephthalic and isophthalic units is between 55% and 85% and preferably between 55% and 70%, ideally 60%. The terms "terephthalic unit" and "isophthalic unit" mean the formula of terephthalic acid and isophthalic acid, respectively.

These polyarylene ether ketones are in the form of powders that may be prepared by grinding or precipitation.

Mixtures of various polyarylene ether ketone powders are not excluded in the context of the invention. According to a preference, the mixtures of various polyarylene ether ketone powders comprise a polyether ketone ketone combined with another polyarylene ether ketone or a mixture of two PEKKs of different chemical structure. Thus, a polyarylene ether ketone will be combined with a PEK, PEEEKEK, PEEK, PEKEKK or PEKK. According to a preferred form, the PEKK will be combined with PEK, PEEEKEK, PEEK or PEKEKK or a PEKK of different chemical formula, the PEKK representing more than 50% by mass, limit inclusive.

The hydrophilic flow agents used in the context of the invention may be inorganic pigments preferably chosen from silicas and aluminas.

The hydrophilic silicas used in the context of the invention are constituted of silicon oxide. They are fumed silicas without any specific treatment, unlike the hydrophobic silicas, which are fumed silicas that have undergone a chemical treatment such as grafting with dimethylchlorosilane. It would not constitute a departure from the context of the invention to use silicas synthesized via another manufacturing method.

The silicas commonly used are commercial products whose trade name is Aerosil® (supplied by Evonik) or Cab-O-Sil® (supplied by Cabot).

These silicas are composed of nanometric primary particles (typically between 5 and 50 nm for fumed silicas). These primary particles are combined to form aggregates. In use as flow agent, silicas are found in various forms (elementary particles and aggregates).

The powders or powder mixtures comprising hydrophilic flow agents used in the context of the invention may, where appropriate, be supplemented or contain various compounds. Among these compounds, mention is made of reinforcing fillers, especially mineral fillers such as carbon black, nanotubes, which may or may not be carbon-based, fibers (glass, carbon, etc. fibers), which may or may not be ground, stabilizers (light stabilizers, in particular UV stabilizers, and heat stabilizers), optical brighteners, colorants, pigments, energy-absorbing additives (including UV absorbers) or a combination of these fillers or additives.

EXAMPLES

Measurement of the Flowability:
The Flowability of These Powders was Determined in Glass Funnels in the Following Manner:
  Fill glass funnels with a 17 or 12 mm orifice (FIG. 1) with the powder up to 5 mm from the rim. Stopper the bottom orifice with the finger.
With, for a 12 mm Funnel:
  $d_e$=39.2 mm
  $d_o$=12 mm
  h=106 mm
  $h_1$=83 mm
and for a 17 mm Funnel:
  $d_e$=42.0 mm
  $d_o$=17 mm
  h=112 mm
  $h_1$=67 mm
Measure with a chronometer the flow time of the powder.
If flow does not take place, tap the funnel using a spatula. Repeat the operation if necessary.
Note the flow time and the number of taps given with the spatula.

Estimation of the Coalescence:
The coalescence of the powders is estimated by means of the following protocol:
  deposition of powder onto a steel plate
  baking, at 340° C. for 15 minutes, of the plate coated with powder
  observation of the coated plate after cooling after removal from the oven
The coalescence will be judged to be proportionately better the more invisible the steel plate has become following the coalescence/film formation of the powder.

Example 1

A Kepstan® 6003 PL powder from the company Arkema, containing 60% of terephthalic units relative to the sum of the terephthalic and isophthalic units, whose particle size has a Dv50 of 50 µm plus or minus 5 µm, was supplemented with 0.4% of Cab-O-Sil® TS-610 silica in a Magimix kitchen blender at high speed for 100 seconds.

The Dv50 is also known as the volume median diameter, which corresponds to the particle size value which divides the population of particles examined exactly into two. The Dv50 is measured according to standard ISO 9276—parts 1 to 6. In the present description, a Malvern Mastersizer 2000 particle size analyzer is used, and the measurement is taken in the liquid route by laser diffraction on the powder.

The silica Cab-O-Sil® TS-610 is a fumed silica that has been made hydrophobic by treatment with dimethylchlorosilane. It will be referred to hereinbelow as "TS-610".

The powder has excellent flowability (time <10 s, 0 taps for a 17 mm funnel), but the coalescence, estimated as described above, is very poor, the steel plate still being clearly visible.

The silica may thus be an anti-coalescer at a high content.

Example 2

A Kepstan® 6003 PL powder from the company Arkema, containing 60% of terephthalic units relative to the sum of the terephthalic and isophthalic units, whose particle size has a Dv50 of 50 μm plus or minus 5 μm, was supplemented with Cab-O-Sil® TS-610 silica in a Magimix kitchen blender at high speed for 100 seconds.

A second sample of the same Kepstan powder is supplemented with Cab-O-Sil® M-5 silica according to the same protocol. The silica Cab-O-Sil® M-5 is a hydrophilic fumed silica that has not undergone any specific treatment. It will be referred to hereinbelow as "M-5".

The flowability results for the two supplemented powders are given in Table 1 in comparison with the silica-free powder.

TABLE 1

| | | Without silica | 0.1% TS 610 | 0.2% TS 610 | 0.1% M5 | 0.2% M5 |
|---|---|---|---|---|---|---|
| Flowability 12 mm funnel | Time (s) | 90 | 60 | 12 | 80 | 22 |
| | Number of taps | multi | multi | 3 | multi | 14 |
| Flowability 17 mm funnel | Time (s) | 48 | 13 | 9 | 22 | 12 |
| | Number of taps | 40 | 3 | 0 | 10 | 1 |

The term "multi" is used when the funnel is tapped continuously.

It is found that the two types of silica improve the flowability and they are thus both potential flow agents for PEKK.

Example 3

Another Kepstan® 6003 PL powder from the company Arkema is supplemented in the Magimix blender either with 0.05% Cab-O-Sil® TS-610 silica or with 0.05% Cab-O-Sil® M-5 silica.

These powders are, on the one hand, stored at 23° C. and 50% relative humidity up to moisture saturation (in the case, for example, of storage of the powder before machine use). The moisture content is measured by the Karl Fischer method (desorption of water from the Kepstan® powder by treatment for 20 minutes at 250° C.). On the other hand, the powders are dried overnight at 140° C. The moisture content is also measured by the Karl Fischer method (same protocol as above).

The flowability results for the two supplemented powders with different moisture contents are given in Table 2.

TABLE 2

| | | 0.05% TS 610 | | 0.05% MS | |
|---|---|---|---|---|---|
| Moisture content | | 0.25% | 0.5% | 0.25% | 0.53% |
| Flowability 17 mm funnel | Time (s) | 7 | 5 | 6 | 6 |
| | Number of taps | 0 | 0 | 0 | 0 |

The moisture contents of 0.5% and 0.53% correspond to the state of the material saturated with moisture at 23° C. and 50% relative humidity.

The moisture contents of 0.25% correspond to the state of the material after drying at 140° C. overnight.

The moisture contents are not affected by the nature of the silica.

It emerges that, irrespective of the silica used, the flowability is not affected by the moisture content. In particular, no deterioration of the flowability is observed for powders saturated with moisture (23° C., 50% relative humidity), even in the case of using a hydrophilic silica as flow agent.

Example 4

Three samples of Example 2 (not supplemented, supplemented with 0.2% of hydrophobic silica (TS-610), supplemented with 0.2% of hydrophilic silica (M-5)) are deposited on three steel plates.

These coated plates are placed in an oven maintained at 340° C. for 15 minutes.

Figure 2:
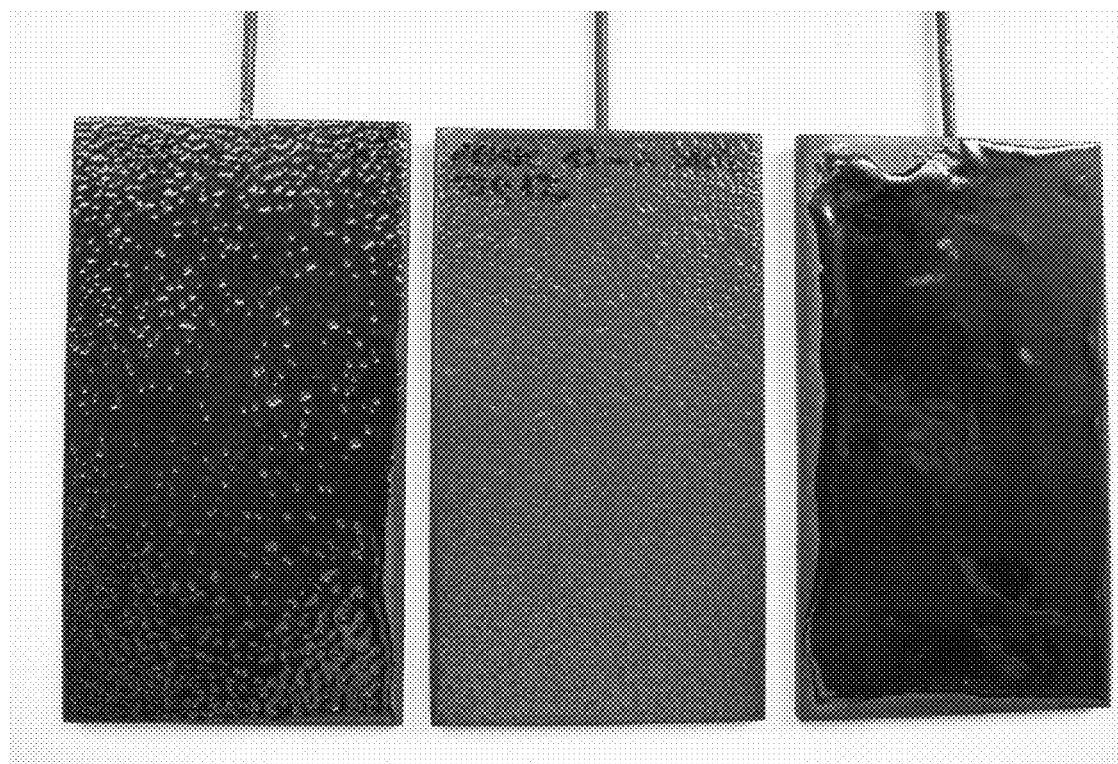
FIG. 2 depicts coated plates in accordance with an example of the present disclosure.
Figure 3:
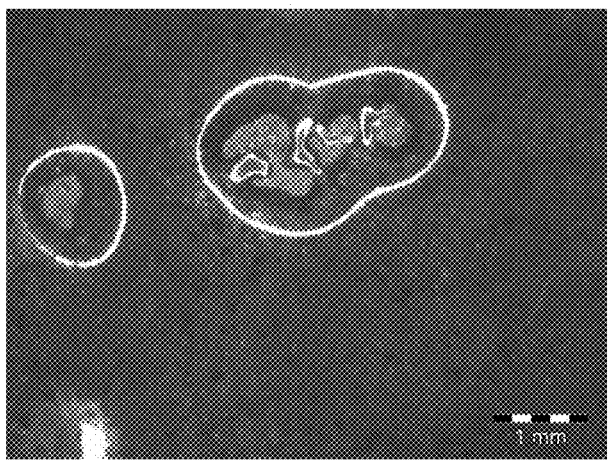
FIG. 3 depicts binocular images of coatings in accordance with an example of the present disclosure.
Figure 3:
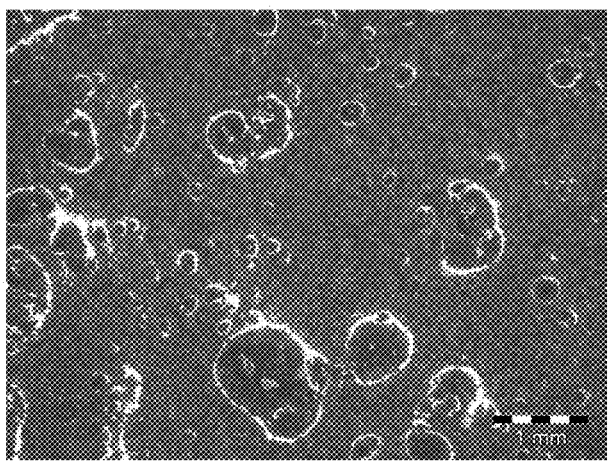
Figure 3:

They are then cooled, and the PEKK coating at the surface of the plates is then observed (FIGS. 2 and 3), visually and under binoculars (Stemi SV11 from Zeiss).

Visually (FIG. 2), a much smoother surface is observed when the hydrophilic silica (M-5) is used, demonstrating the good coalescence of the powder during the oven treatment. Without silica and with the TS-610 silica, the coating is not continuous and, consequently, the steel plate remains locally visible.

The binocular images (FIG. 3) confirm the preceding observations: there are areas where locally the steel plate can still be seen in the case of the non-supplemented powder and of the powder supplemented with 0.2% of TS-610 silica, whereas, in the case of the powder supplemented with M-5 silica, the steel plate is no longer visible. This confirms the better coalescence of the powder supplemented with M-5 during the oven treatment.

Embodiments

1. A composition comprising from 99.6% to 99.99% by weight of at least one powder of at least one polyarylene ether ketone and 0.01% to 0.4% by weight of a hydrophilic flow agent, said hydrophilic flow agent being characterized by a gain in mass (amount of water absorbed), after 5 days of conditioning at a relative humidity of 95%, of greater than 0.5%, said gain in mass of the flow agent being determined by Karl Fischer measurement after desorption of the water by a 15-minute treatment at 170° C.

2. The composition as in embodiment 1, in which the hydrophilic flow agent is a hydrophilic silica.

3. The composition as in embodiment 1, in which at least one polyarylene ether ketone is PEKK.

4. The composition as in embodiment 3, in which the PEKK has a mass percentage of terephthalic units relative to the sum of the terephthalic and isophthalic units of between 55% and 85%.

5. The composition as in embodiment 3, in which, in addition to the PEKK, a PEK, PEEKEK, PEEK, PEKEKK or PEKK powder of different chemical structure is added, the PEKK representing more than 50% by mass, limit inclusive.

6. The composition as in embodiment 1, containing a filler.

7. The composition as in embodiment 1, containing at least one additive.

8. The use of a composition as in one of embodiments 1 to 7 in a laser sintering process.

9. An object obtained using a composition as in one of embodiments 1 to 7.

The invention claimed is:

1. A method for producing a surface coated with a coating having an improved coalescence, the method comprising the steps of:
   a. providing a composition comprising from 99.6% to 99.99% by weight of at least one powder of at least one polyarylene ether ketone and 0.01 to 0.4% by weight of a hydrophilic flow agent, the hydrophilic flow agent being hydrophilic silica;
   b. conditioning the powder composition in an environment with 50% relative humidity
   c. depositing the composition onto a surface forming a coated surface; and
   d. baking the coated surface to form a coalesced film on the surface.

2. The method of claim 1, wherein the at least one powder of at least one polyarylene ether ketone is present in an amount within the range of 99.8% to 99.99% by weight and the hydrophilic flow agent is present in an amount within the range of 0.01% to 0.2% by weight of a hydrophilic flow agent.

3. The method of claim 1, wherein the at least one powder of at least one polyarylene ether ketone is present in an amount within the range of 99.9% to 99.99% by weight and the hydrophilic flow agent is present in an amount within the range of 0.01% to 0.1% by weight of a hydrophilic flow agent.

4. The method of claim 1, in which at least one polyarylene ether ketone is PEKK.

5. The method of claim 4, further containing a filler.

6. A coated surface produced by the method of claim 5.

7. The method of claim 4, further containing at least one additive.

8. A coated surface produced by the method of claim 4.

9. The method of claim 4, in which the PEKK has a mass percentage of terephthalic units relative to the sum of the terephthalic and isophthalic units of between 55% and 85%.

10. The method of claim 9, in which, in addition to the PEKK, a PEK, PEEKEK, PEEK, PEKEKK or PEKK powder of different chemical structure is added, the PEKK representing more than 50% by mass, limit inclusive.

11. A coated surface produced by the method of claim 10.

12. The method of claim 4, in which, in addition to the PEKK, a PEK, PEEKEK, PEEK, PEKEKK or PEKK powder of different chemical structure is added, the PEKK representing more than 50% by mass, limit inclusive.

13. The method of claim 1, further containing a filler.

14. The method of claim 1, further containing at least one additive.

15. A coated surface produced by the method of claim 1.

16. The method of claim 1, in which baking occurs in an oven.

* * * * *